Nov. 20, 1928.
J. ZAGORSKI
1,692,529
MACHINE FOR MAKING HOLLOW TUBES OR CONDUCTORS
Original Filed Jan. 29, 1926   6 Sheets-Sheet 1
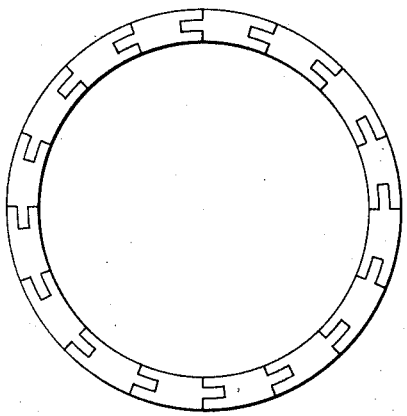
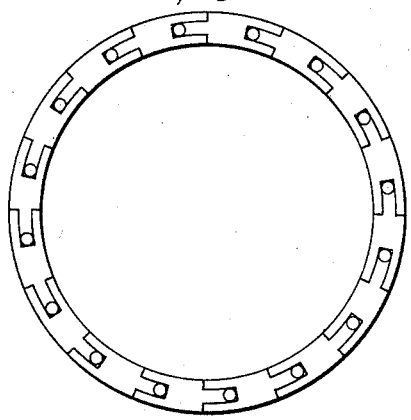
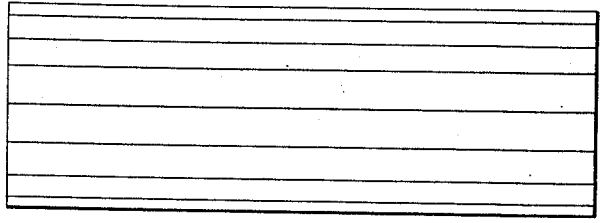
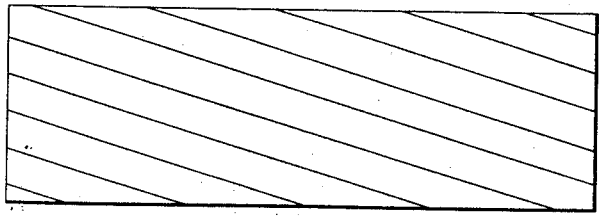
Inventor:
Johann Zagorski
By Byrnes Townsend Bickenstein
Attorneys Nov. 20, 1928.

J. ZAGORSKI 1,692,529

MACHINE FOR MAKING HOLLOW TUBES OR CONDUCTORS

Original Filed Jan. 29, 1926   6 Sheets-Sheet 2

Inventor:
Johann Zagorski
By Byrnes Townsend Brickenstein
Attorneys.

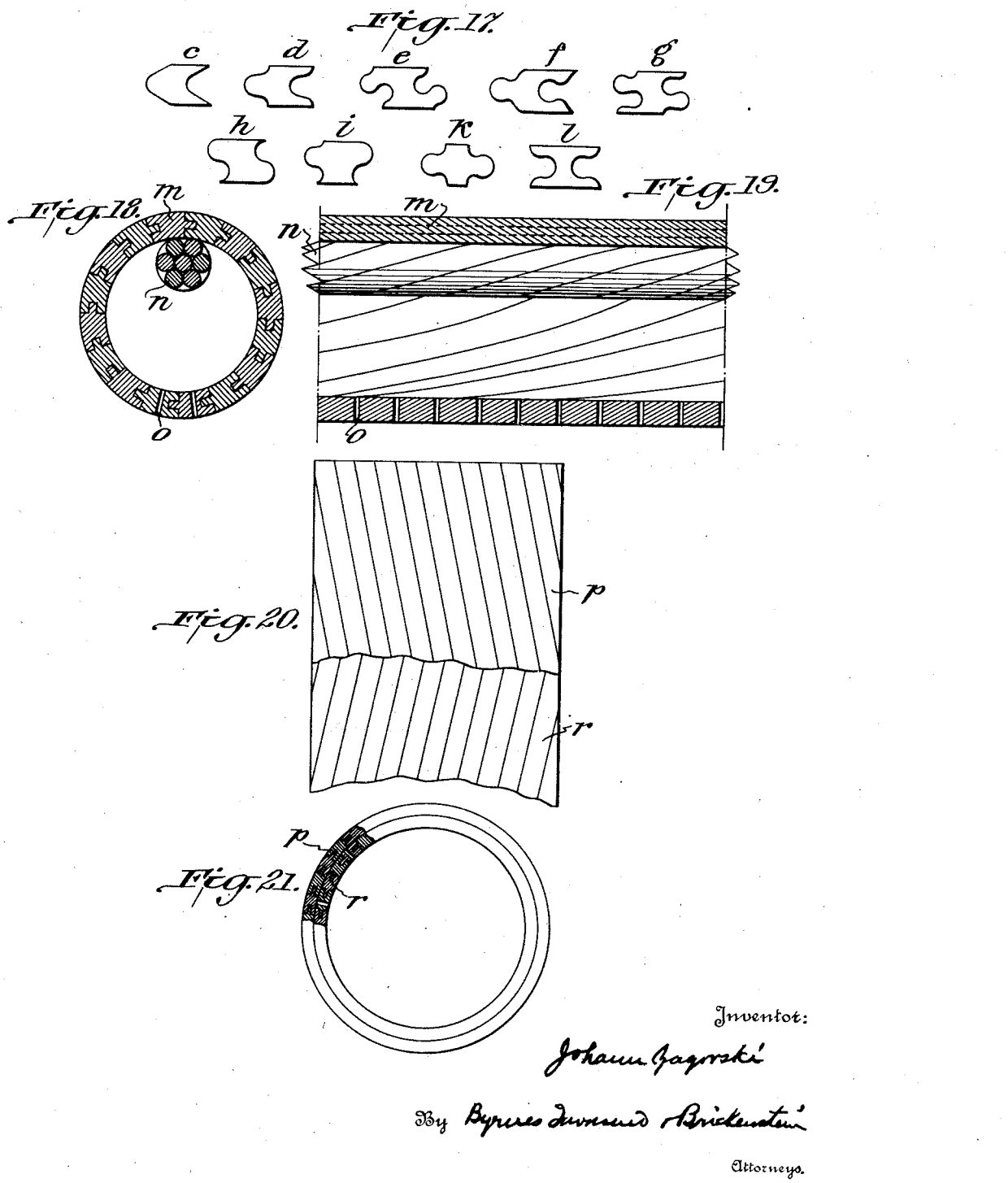

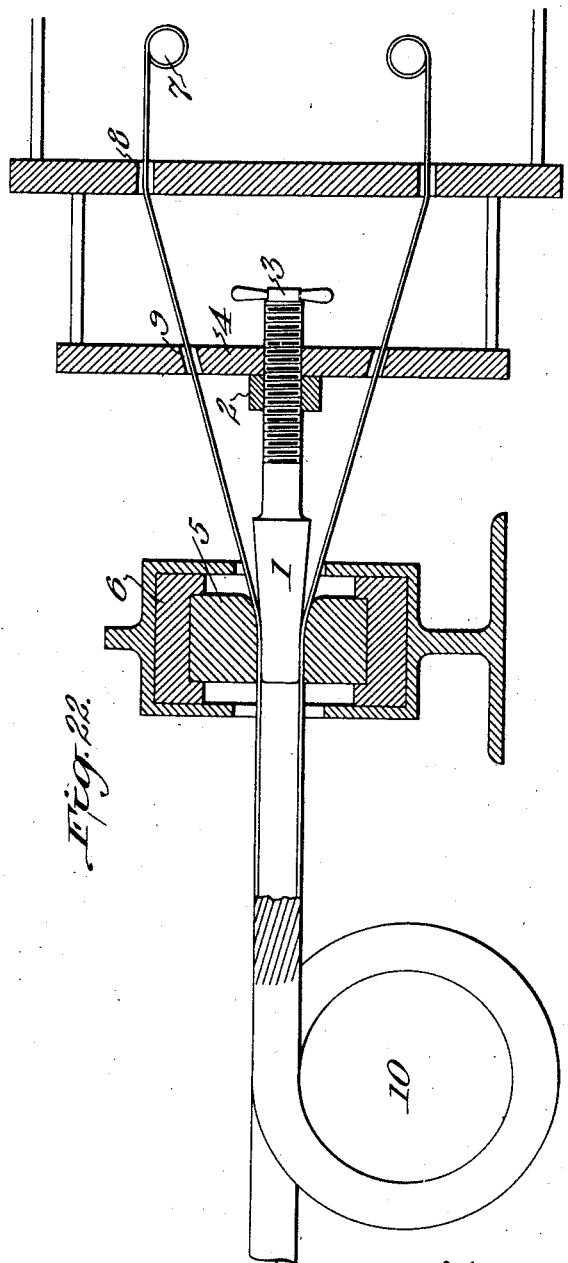

Nov. 20, 1928.  1,692,529
J. ZAGORSKI
MACHINE FOR MAKING HOLLOW TUBES OR CONDUCTORS
Original Filed Jan. 29, 1926   6 Sheets-Sheet 5
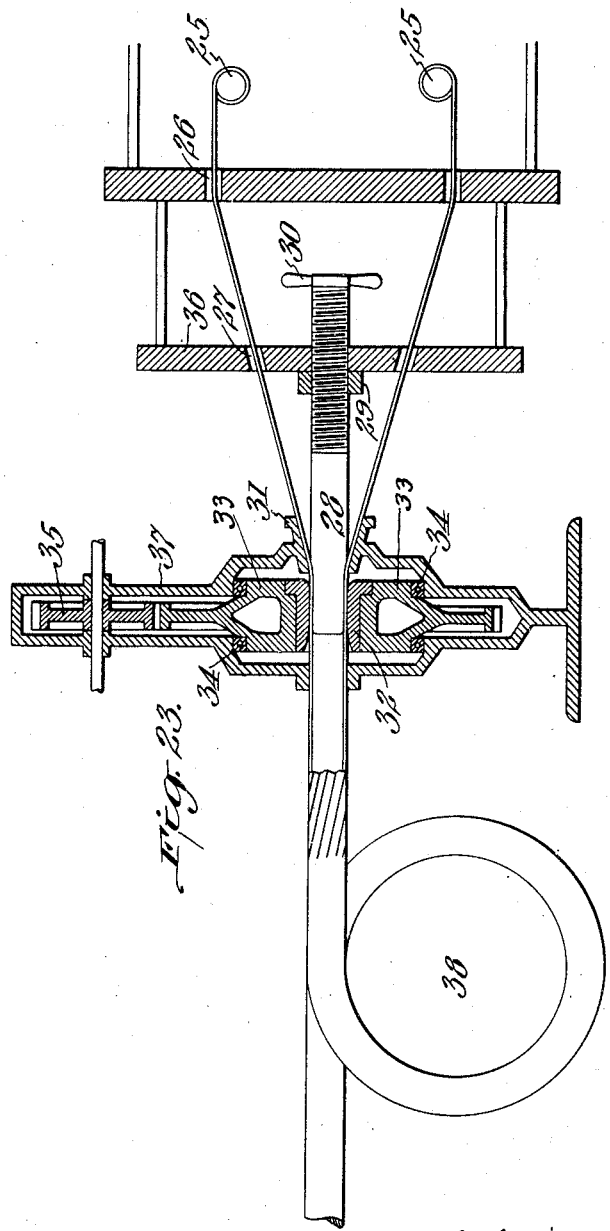
Inventor:
Johann Zagorski
By Byrnes Townsend & Brickenstein
Attorneys.

Nov. 20, 1928.  
J. ZAGORSKI  
1,692,529  
MACHINE FOR MAKING HOLLOW TUBES OR CONDUCTORS  
Original Filed Jan. 29, 1926  6 Sheets-Sheet 6
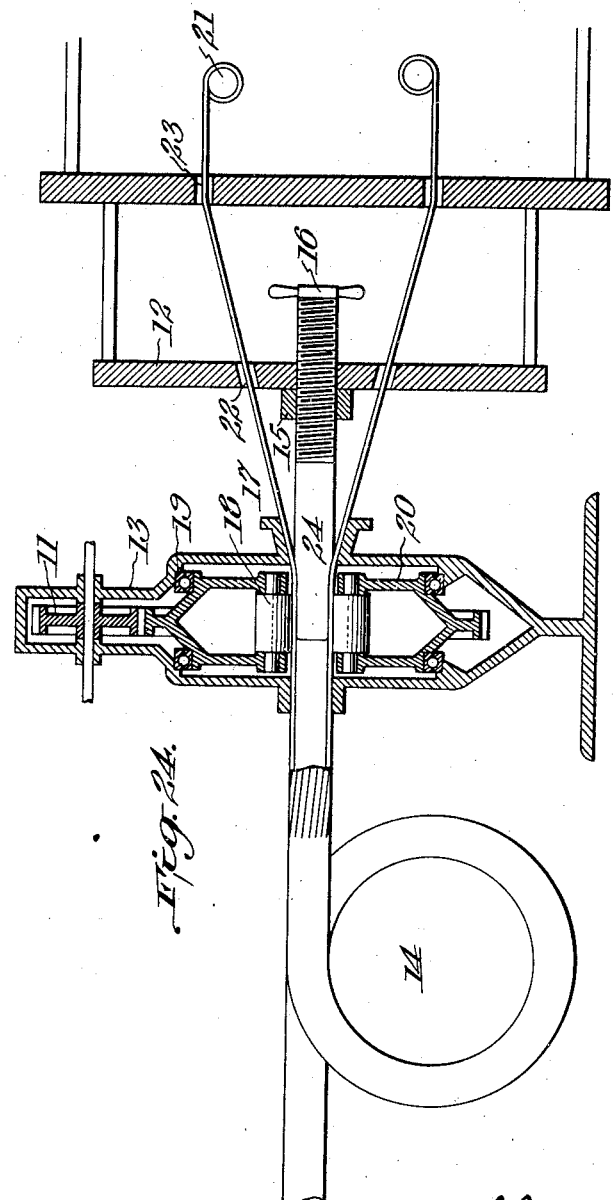

Patented Nov. 20, 1928.

1,692,529

UNITED STATES PATENT OFFICE.

JOHANN ZAGORSKI, OF FRANKFORT-ON-THE-MAIN, GERMANY, ASSIGNOR, BY MESNE ASSIGNMENTS, TO AMERICAN LUIGI CORPORATION, OF NEW YORK, N. Y., A CORPORATION OF NEW YORK.

MACHINE FOR MAKING HOLLOW TUBES OR CONDUCTORS.

Original application filed January 29, 1926, Serial No. 84,796, and in Germany February 3, 1925. Divided and this application filed December 14, 1926. Serial No 154,841.

This invention relates to a machine for making a hollow tube or conductor made up of interlocked profile bands.

The present invention relates to a machine for making hollow conductors which while made from a single layer of interlocked bands, have sufficient resistance to splaying or untwisting as well as to the influence of radial forces. By this means it is possible to utilize the cross-section completely as conductive cross-section.

This effect is attained by providing the bands at the contacting edges with grooves and tongues. The manufacture of these conductors is effected in such way that while in the stranding machine, the tongues are inserted into the slightly spread legs of the grooves whereupon the legs are pressed together. The pressing together must, however, be effected in such a manner that the individual bands remain longitudinally displaceable in relation to each other for the purpose of affording the required flexibility of the conductor.

In order more clearly to understand the invention, reference is made to the accompanying drawings, in which Figures 1 to 8 illustrate by way of example embodiments of the conductor according to the invention.

Figs. 1 to 4 show several end views of the bands;

Figs. 5 and 6 show end views of the complete hollow conductor;

Fig. 7 is an elevation of an untwisted cable;

Fig. 8 is an elevation of a twisted cable;

Figure 9:
Figs. 9 to 16 show segments of hollow conductors with grooves and tongues arranged in a radial direction.

Fig. 17, c to l indicate band profiles in which the grooves and tongues are rounded and/or overlapping;

Fig. 18 is a cross-section;

Fig. 19 is a longitudinal section through an embodiment of hollow conductor of the invention and inclosing a supporting cable;

Fig. 20 is a plan view of a hollow conductor which consists of two layers of left and right hand twisted profile bands stranded together, the upper layer being cut off to show the lower layer;

Fig. 21 is a partial cross-section of Fig. 20;

Figs. 22 and 23 illustrate apparatus in which the required alteration in the shape of the bands during the stranding is effected by drawing;

Fig. 24 shows a slightly modified apparatus in which the alteration in shape is effected by rolling.

It is obvious that several cross-sectional forms may be employed for the bands. The simplest of these is the rectangular form shown in Fig. 2.

Fig. 1 shows an end view of groove and tongue of swallow-tail form while Figs. 3 and 4 represent cross-sectional forms which have proved of especial utility for untwisted conductors. In this case both the grooves as well as tongues exhibit one or more projections and recesses which engage in each other after connection so that such a hollow conductor offers especially high resistance against the influence of radial forces. It is, of course, also possible to employ hollow conductors made from such bands, in the twisted form.

If a conductor of great tensile strength is to be made, wires of metal of a greater strength can be inserted into the grooves. The circular form is especially suitable as a cross-sectional form for these wires, because in this case a special twist is imparted to the wires on being stranded.

The profiles of the wires or bands composing the hollow conductor of the present invention can be of very diverse shapes. The grooves and tongues need not be formed in a tangential direction but may be formed in radial direction. In this case two or more layers of profiled wires or bands can be employed in such a way that the individual layers of the conductors engage each other similarly to gear teeth in a radial direction. Even when employing only one layer of wires or bands, such a radial arrangement of groove and tongue can be effected, if the band or wire profiles are so chosen that they partly cover or overlap each other in the profile of the finished conductor. It is also possible to employ band profiles in which the individual profiles are provided with grooves and tongues both in a tangential and at the same time in a radial direction. Moreover by suitably selecting the band profiles, the mobility of the individual bands in relation to each other, in the finished hollow conductor, can be considerably increased so that the finished hollow conductor has a greater flexibility. This greater flexibility can be atained according to the invention by composing the individual band profiles of sections of a circle.

The provision of the band profile with a groove and tongue can also be complemented or replaced by overlapping.

If the hollow conductors of the invention are to be produced from material of low strength such as aluminium, with as large a diameter as possible and with a small conductive cross-section, those difficulties may arise in this case which have led to the construction of steel-aluminium cables. In the hollow conductor of the present invention these difficulties are overcome by suspending it from a carrier cable which is preferably arranged within the hollow conductor. In the construction of the hollow conductor of the present invention, not only the carrier cable but also the shell can be tensioned so that the latter takes up part of the tension forces.

Porcelain rings or similar bodies adapted to support the shell can be arranged around the carrier cable at suitable intervals. In this embodiment the hollow conductor of the invention can of course also be made of other material than steel and aluminium. The hollow cable can be also provided in a known manner, with openings serving to discharge liquids which may collect in the interior of the cable.

When twisted hollow conductors are subjected to high tensions, torsional forces may be set up. In order to exclude these in the hollow conductor of the invention, two layers of profiled wires or bands of the above-described construction with left and right hand twists respectively are spliced together so that the torsional forces are compensated in the hollow cable itself. Such a hollow conductor may be laid with or without the aid of a supporting cable.

The above described modification of the hollow conductor of the invention are illustrated in the Figs. 9 to 21 of the accompanying drawings and will hereinafter be explained in greater detail.

Figure 10:
Figure 11:
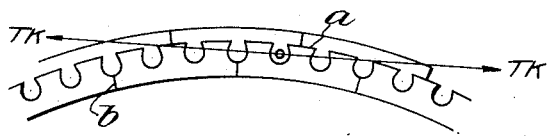
Figure 12:
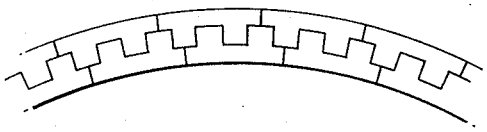
Figure 13:

In the hollow conductors in which the grooves and tongues are radially arranged as shown in Figures 9, 10 and 12, the same band or wire profile is employed for both layers whilst Fig. 11 shows an embodiment of a conductor in which outer layer $a$ is composed of a different band profile to the inner layer $b$.

Figs. 13 to 16 illustrate embodiments of conductors according to the invention, which consist of only a single layer. As regards the shape of the profile of the wires and bands and the members of the layers, it is obvious that numerous other embodiments are possible all of which include the characteristic features of the invention.

Figure 14:
Figure 15:
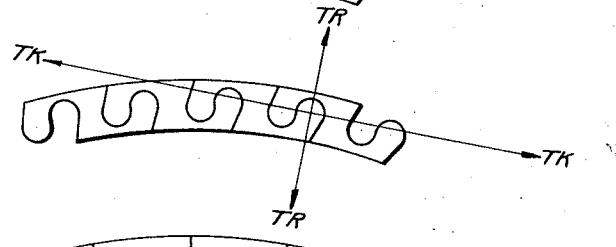
Figure 16:
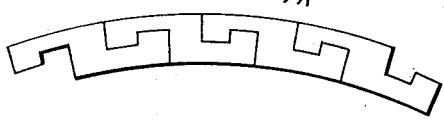

By virtue of the fact that the teeth of the bands or wires of the individual layers engage each other in the radial direction, the high voltage conductor of the invention is especially suitable for compensating tangential stresses (TK Figs. 14 and 15). If in addition the teeth of the bands are conically shaped towards their base, as for example in the high voltage conductors according to Figs. 9 to 11 and 13 to 15, then radial stresses (TR Fig. 15) can also be avoided. This embodiment of the high voltage conductor of the invention consequently possesses a high resistance to torsion and all other stresses which render the construction of conductors of large diameter and low conductive cross-section difficult. A further advantage of this embodiment of such a hollow conductor is that the profiles of the wires or bands of which it is composed can be easily so selected that the conductor obtains a specially smooth surface.

The rounded profiles of the wires or bands can be formed symmetrically as shown in Figs. 17, $c$, $d$, $f$, $k$ and $l$. The profiles $k$ and $l$ are required together when constructing the same hollow conductor so that in the finished hollow conductor one profile $k$ which contains the tongues is arranged in alternate succession to the profile $l$ which contains the grooves.

It is, of course, also possible to employ unsymmetrically shaped band profiles. Such profiles are for example shown in Fig. 17 $e$, $g$, and $i$. In this case the grooves and tongues are also rounded. This special shaping apart from giving increased flexibility enables considerable stresses in the direction of the periphery of the hollow cable to be avoided. Profiles in which the grooves and tongues are replaced or complemented by overlapping are for example illustrated in Figs. 17, $e$, $h$, and $i$. These overlappings may be rounded off or angular. It is obvious that in this case also, a number of other profiles than those shown in the figures are possible. The suitable selection of the band profiles has the further advantage that the manufacturing costs, both of the bands as well as of the hollow conductors, can be reduced at the same time.

In Figs. 18 and 19, which represent a hollow conductor according to the invention, with a carrier cable, $m$ indicates the hollow cable composed of a number of profiled laminations, $n$ the carrier cable, and $o$ the openings in the hollow cable for removing liquids from the interior thereof.

As shown in Figs. 20 and 21 the hollow conductor of the invention is composed of an upper layer $p$ stranded with a right hand twist and of a lower layer $r$ stranded with a left hand twist.

The tubular bodies made according to the invention can also be employed for other purposes.

In the manufacture of hollow conductors according to the invention, the grooves and tongues or the overlappings of the individual bands must engage well with each other. Moreover the hollow conductor after stranding, must have as smooth a surface as possible. For this reason it is necessary for the grooves to be open to such an extent that the tongues can be inserted thereinto without difficulty.

On stranding, the walls of the grooves must again be bent together. Moreover, owing to the desired smooth surface of the hollow conductor, a corresponding alteration in shape must be imparted to the individual bands during the stranding. The usual stranding methods and machines cannot therefore be employed for the production of the hollow conductor of the invention. However, they can be adapted for this purpose by suitable modification.

In carrying out the invention, the required alteration, in the shape of the individual bands, is effected by subjecting same during stranding, simultaneously to a suitable mechanical working. For example when combining them to form a cable, the bands are pulled over a longitudinally adjustable profiled core or mandrel through a suitable draw plate. Inasmuch as when the drawing appliance is of suitable shape, the adjustable pressure forces of the core only require small forces for drawing the profiled bands over the core, the expenditure of power can be supplied similarly as in the usual stranding machines by the pulling drum, the drive of which is correspondingly increased.

In this connection, it is advantageous to rotate the draw plate. By virtue of this rotary movement the drawing appliance acts similarly to a rolling device. In such case, the total power required for the shaping of the wires lying on the periphery of the cable or the like, is divided into two components, of which one has to be supplied by the device pulling the cables through the drawing appliance while the other part is supplied by the driving machine effecting the rotation of the drawing iron. It has been found that by means of this rotating movement of the drawing appliance the entire consumption of energy for the production of the smooth surface is considerably reduced.

The required shape can advantageously be imparted to the individual bands during the stranding by a rolling process instead of by a drawing process. In such case, the drawing appliance is replaced by a suitable separately driven rolling device. The power required to pass the hollow conductor through the rolling and stranding device can be supplied by the usual pulling drum of the usual stranding machines.

The method of production of the above described hollow conductor will hereinafter be more fully explained.

The apparatus shown in Fig. 22 consists of an adjustable profiled core 1, which is carried by a female member 2 and may be stationary or rotating. The hand wheel 3 serves for the adjustment of the core. The female member 2 is mounted on a disc or the like 4 which is firmly fixed onto the stranding machine proper. The core or mandrel is inserted in the guide member 5 serving accurately to guide the profile and which finally terminates in the exact diameter of the profile. The guide member is fixed on a disc or the like 6 which may be either stationary or rotating.

The profiled bands are passed in the manner usual in stranding machines, from spools 7 through suitable guides 8 and 9 to the drawing appliance proper.

The wires engage with each other in the guide member 5 and on further advancing through the same and over the profiled core they are subjected to a pressure which alters the shape of the profiles in such a manner that the individual profiles now engage with each other. The pressure and thus, at the same time, the degree of the alteration of the shape can be adjusted by adjusting the core or mandrel 1, the longitudinal profile of which is, for this purpose, shaped to a suitable curve.

The tension required for the drawing is produced by slinging the hollow conductor around a hauling drum 10 and then passing same to the cable drum. The stranding can be effected with or without twisting, by suitably adjusting the stranding machine. The production of the hollow conductor of the invention by drawing without the employment of a core, can also be effected by means of the same apparatus.

The stranding device shown in Fig. 24 consists of an adjustable profiled core or mandrel 24 which is guided in a female member 15 and which may be either stationary or rotatable. The hand wheel 16 is employed to effect the necessary adjustments. The female member 15 is mounted in a disc or the like 12, which is fixed onto the stranding machine proper. The core 24 is inserted in the guide member 17 which serves to guide the profile. Around the core are arranged profiled rollers 18 which coact with the profiled core 24 to allow a gradual rolling to the desired shape. The rollers 18 are arranged in a gear wheel 20 which runs on ball bearings 19. This gear wheel 20 is driven by pinion 11 which is mounted on a motor or may be driven through a suitable transmission. The rotatable part is housed in a closed casing 13 and runs in an oil bath.

The profiled bands move in a similar manner as in stranding machines of the usual construction, from spool 21 through guides 22, 23 to the rolling device proper. The profiles engage with each other within the guide member 17 and, on passing further between the profiled core 24 and the profiled roller 18, are then subjected to a gradual pressure which effects the desired alteration in the shape of the individual bands and the interengagement of the profiles. The tractive force required for the drawing is obtained by slinging the hollow conductor around the hauling drum 14 and then passing it to the cable drum. By suitably adjusting the stranding machine, the stranding can be effected also in this case with or without twisting.

Fig. 23 shows substantially the same arrangement as Fig. 22 except that the drawing appliance in which the connection of the profiled wires or bands to a cable is effected, can be rotated. 25 are the spools with the wires, tapes or bands, 26, 27 and 31 are guides for same, whilst 32 indicates the drawing appliance. Into this latter projects the conical core 28 which is fixed on the plate 36 and adjustable by means of female member 29 and handle 30. The disc 36 can be fixed onto the stranding machine proper. The drawing appliance 32 is arranged in the gear wheel 33 which runs on ball bearings 34. The gear wheel 33 is driven by pinion 35 which can in turn be driven in any suitable manner. The rotatable part is arranged in a closed housing 37 and runs in an oil bath. 38 is the hauling drum.

In the production of the rope or tubes the wires or bands are moved in a similar manner as in the stranding machines of the usual construction, from the spools 25 through the guides 26, 27 to the draw plate. When employing profiled wires or bands with teeth or overlappings the guide member 31 is so constructed that it brings these teeth or overlappings into mutual engagement. On further advancing between the profiled core 28 and the rotating drawing appliance 32, the wires or bands joined together to a cable, are gradually subjected to a pressure which imparts the desired alteration in shape. The tractive power for drawing the cable through the drawing iron is produced in the usual manner by the hauling drum 38. If cables with full profiles are to be produced, the core 28 is naturally omitted. Moreover when manufacturing hollow conductors, it is possible to work without a core. Apart from the hollow conductor of the invention also other hollow conductors which are composed of profiled bands can be produced according to the same method.

In each form of the machine the separate bands or strips are fed continuously through a guiding device by which they are assembled with the edges which are to be engaged in proximity, and are then drawn through the die which has an effective internal diameter which corresponds to the desired exterior diameter of the finished tube. The tongues or projections are thereby forced into the grooves or recesses, and the walls of the grooves are gradually compressed or forced about the tongues whereby these cooperating members are interlocked to form a self-sustaining tube.

The term "die" is herein used to include any means for so applying pressure, such as a die of the draw plate type, as in Figs. 22 and 23, or a die comprising a series of circumferentially arranged rollers, as in Fig. 24.

The longitudinally extended tubular bodies according to the invention can also be employed for the construction of underground cables and the like.

This application is a division of my application Serial No. 84,796, filed January 29, 1926.

I claim:

1. A machine for forming hollow tubes or conductors from bands provided with corresponding projections and recesses consisting of pressure means for interlocking the bands, such means comprising a mandrel and a die surrounding the mandrel and having an internal diameter corresponding to the external diameter of the finished tube, means for guiding the bands into engagement with each other and means for pulling the bands through the pressure means, whereby pressure is applied to the wires or strips to force the projections and recesses into interlocking engagement.

2. A machine according to claim 1 in which the mandrel is adjustable.

3. A machine according to claim 1 in which the mandrel is longitudinally adjustable.

4. A machine according to claim 1 in which the mandrel is longitudinally adjustable and rotatable.

5. A machine according to claim 1 in which the die is rotatable about the mandrel.

6. A machine according to claim 1 in which the die is rotatable about the mandrel and mounted in a rotatable gear.

7. A machine according to claim 1 in which the mandrel is circular in cross-section and has an inwardly tapering end.

8. A machine for forming hollow tubes or conductors from bands provided with corresponding projections and recesses comprising means for guiding the bands into engagement with each other, a die having an internal diameter corresponding to the external diameter of the finished tube, and means for pulling the strips through the die whereby pressure is applied to the bands to force the projections and recesses into interlocking engagement.

9. A machine as claimed in claim 8 in which the die is rotatable.

10. A machine as claimed in claim 8 in which the die is rotatable and mounted in a rotatable gear.

11. A machine as claimed in claim 8 in which the die comprises rotatable members assembled in a closed housing for containing an oil bath.

In testimony whereof, I affix my signature.

JOHANN ZAGORSKI.